(12) United States Patent
Hille

(10) Patent No.: US 12,051,401 B2
(45) Date of Patent: *Jul. 30, 2024

(54) CONTROL DEVICE FOR A FURNITURE DRIVE AND METHOD FOR CONTROLLING A FURNITURE DRIVE

(71) Applicant: DEWERTOKIN GMBH, Kirchlengern (DE)

(72) Inventor: Armin Hille, Bielefeld (DE)

(73) Assignee: Dewertokin Technology Group Co., Ltd, Jiaxing (CN)

( * ) Notice: Subject to any disclaimer, the term of this patent is extended or adjusted under 35 U.S.C. 154(b) by 711 days.

This patent is subject to a terminal disclaimer.

(21) Appl. No.: 16/964,503

(22) PCT Filed: Jan. 24, 2019

(86) PCT No.: PCT/EP2019/051780
§ 371 (c)(1),
(2) Date: Jul. 23, 2020

(87) PCT Pub. No.: WO2019/145440
PCT Pub. Date: Aug. 1, 2019

(65) Prior Publication Data
US 2021/0035555 A1    Feb. 4, 2021

(30) Foreign Application Priority Data

Jan. 26, 2018  (DE) .................... 10 2018 101 822.3
Apr. 13, 2018  (DE) .................... 10 2018 108 866.3

(51) Int. Cl.
*G10L 15/04*    (2013.01)
*A47B 9/00*    (2006.01)
(Continued)

(52) U.S. Cl.
CPC ............... *G10L 15/04* (2013.01); *A47B 9/00* (2013.01); *A47B 23/04* (2013.01); *A47C 31/008* (2013.01);
(Continued)

(58) Field of Classification Search
CPC ......... G10L 15/04; G10L 15/30; G05B 15/02; G06F 3/011; A47C 21/003
(Continued)

(56) References Cited

U.S. PATENT DOCUMENTS 5,335,313 A      8/1994  Douglas
2008/0262657 A1  10/2008  Howell et al.
(Continued)

FOREIGN PATENT DOCUMENTS

CA    3064641 A1 * 11/2018
CN    203873375     10/2014
(Continued)

OTHER PUBLICATIONS

International Search Report Issued by the European Patent Office in International Application PCT/EP2019/051780 on Apr. 25, 2019.
(Continued)

*Primary Examiner* — Farzad Kazeminezhad
(74) *Attorney, Agent, or Firm* — Henry M. Felereisen LLC

(57) ABSTRACT

In a method for controlling a furniture drive via voice input, an acoustic signal is converted into an electrical signal. The electrical signal is evaluated by a local voice analysis device, and an operating state of the furniture drive is controlled when a keyword from a set of keywords is recognized during evaluation.

27 Claims, 6 Drawing Sheets

(51) Int. Cl.

| | | |
|---|---|---|
| *A47B 23/04* | (2006.01) | |
| *A47C 21/00* | (2006.01) | |
| *A47C 31/00* | (2006.01) | |
| *G05B 15/02* | (2006.01) | |
| *G06F 3/01* | (2006.01) | |
| *G10L 15/30* | (2013.01) | |
| *H02P 29/00* | (2016.01) | |

(52) U.S. Cl.
CPC ........ *H02P 29/00* (2013.01); *A47B 2200/006* (2013.01); *A47B 2200/0062* (2013.01)

(58) Field of Classification Search
USPC .......................................... 704/246; 345/156
See application file for complete search history.

(56) References Cited

U.S. PATENT DOCUMENTS

| | | | | |
|---|---|---|---|---|
| 2014/0132505 | A1* | 5/2014 | Vennelakanti | G06F 3/011 |
| | | | | 345/156 |
| 2014/0259418 | A1* | 9/2014 | Nunn | A47C 21/003 |
| | | | | 5/713 |
| 2015/0149175 | A1* | 5/2015 | Hirata | G10L 15/30 |
| | | | | 704/246 |
| 2019/0216228 | A1* | 7/2019 | Bertinato | G05B 15/02 |

FOREIGN PATENT DOCUMENTS

| | | |
|---|---|---|
| CN | 104271003 | 1/2015 |
| CN | 105662744 | 6/2016 |
| CN | 106537475 | 3/2017 |
| CN | 206575440 | 10/2017 |
| CN | 107622652 | 1/2018 |
| CN | 107622767 | 1/2018 |
| DE | 42 37 783 | 5/1994 |
| DE | 43 15 210 A1 | 11/1994 |
| DE | 43 15 210 C2 | 8/1997 |
| DE | 202004016265 | 3/2005 |
| DE | 202016105634 | 5/2017 |
| WO | WO 2009/114249 | 9/2009 |

OTHER PUBLICATIONS

German Search Report issued in counterpart German patent application 10 2018 108 866.3 on Oct. 23, 2018.

Translation of German Search Report Issued in counterpart German patent application 10 2018 108 866.3 on Oct. 23, 2018.

Chinese Search Report issued in counterpart Chinese patent application 201980009800.0 on Feb. 17, 2023.

Translation of Chinese Search Report issued in counterpart Chinese patent application 201980009800.0 on Feb. 17, 2023.

\* cited by examiner

CONTROL DEVICE FOR A FURNITURE DRIVE AND METHOD FOR CONTROLLING A FURNITURE DRIVE

CROSS-REFERENCES TO RELATED APPLICATIONS

This application is the U.S. National Stage of International Application No. PCT/EP2019/051780, flied Jan. 24, 2019, which designated the United States and has been published as International Publication No. WO 2019/145440 A1 and which claims the priorities of German Patent Applications, Serial No. 10 2018 101 822.3, flied Jan. 26, 2018, and 10 2018 108 866.3, filed Apr. 13, 2018, pursuant to 35 U.S.C. 119(a)-(d).

BACKGROUND OF THE INVENTION

The invention relates to a method for controlling a furniture drive by means of a voice input, wherein the furniture drive has a control device to which at least one adjustment drive can be connected. The invention further relates to a control device for a furniture drive for carrying out the method.

The publication DE 43 15 210 C2 describes a method for controlling an adjustment device of a furniture drive by means of a voice input. Voice inputs are thereby detected and compared with reference patterns depending on different operating modes, wherein for each operating mode and a selection decision between at most two permissible reference patterns is required. The reduction to only two alternatives in each operating mode technically simplifies the evaluation of the voice input, i.e. the voice analysis. However, the operation of the furniture drive is made more complicated because voice input does not allow the use of natural communication patterns and structures.

The performance of computers and computer networks, which has grown enormously in recent years, has now led to the use of voice control in many areas of application. Last but not least, systems are now known, such as "Google Assistant" from Google Inc. or "Alexa Voice Service" from Amazon Europe Core which enable extensive voice input and output via provided interfaces (API Application Programming Interface), wherein voice input is sent via a network connection to an evaluation computer (server) located in a computer network (cloud), where it is processed and evaluated, for example in the form of recognized text, and sent back via the network to the sender of the request. With this externally (as seen from the application) evaluated voice input, voice control for devices can be implemented in a relatively simple way.

The use of such an external voice evaluation by the control device of a furniture drive allows a comfortable voice input that is understood, for example, even if the spoken language does not follow a strictly prescribed syntax.

However, strict safety requirements must be met for furniture drives in general and in the care or hospital sector in particular. In the case of moving furniture parts, for example, there is a risk of trapping, which ensures that the control device reacts quickly and safely to requests for an emergency shutdown. When using network-based services for voice recognition, the required safety level cannot be achieved. For example, even a brief network disturbance or delay in transmission can result in a safety-relevant command not being detected or only being detected with such a delay that a personal hazard cannot be ruled out.

It is therefore an object of the present invention to create a furniture drive which can be easily brought into a safe state at any time even when using a voice control system. It is a further object to provide a method for controlling a furniture drive with the above-mentioned properties.

SUMMARY OF THE INVENTION

This object is solved by a furniture drive and a method for controlling a furniture drive with the features of the respective independent claim. Advantageous embodiments and further developments are the subject matter of the respective dependent claims.

A method according to the invention of the type mentioned above comprises the following steps:
Converting an acoustic signal into an electrical signal;
Evaluating the electrical signal by at least one local voice analysis device; and
Controlling an operating state of the furniture drive if a keyword from a set of keywords is recognized during evaluation.

The electromotive furniture drive can have different operating states. The following operating states are possible, among others: OFF operating state, ON operating state, STAND-BY operating state, EMERGENCY STOP operating state, MAINS CUT-OFF operating state.

In the OFF operating state, one or more motors of the furniture drive is/are switched off, but can be switched to the ON operating state by an actuator. A power supply is available for the control device.

In the ON operating state, one or more motors of the furniture drive is/are switched on, e.g. by means of manual operation. The power supply of the control unit is available.

In STAND-BY mode, the power supply to the control device and any other transmission units, such as radio gateway and the like, is reduced to a minimum. When the STAND-BY mode is on, it must be switched off to allow operation of the furniture drive. This switching off the STAND-BY mode is also known as "waking up".

It is not possible to switch on the furniture drive motor(s) in the EMERGENCY STOP operating state. If the EMERGENCY STOP operating state is switched on during the ON operating state, any motor(s) that are switched on will be switched off immediately. The power supply of the control device is available. The EMERGENCY STOP operating state is terminated by suitable measures not described in more detail here once the cause of the EMERGENCY STOP has been eliminated.

In the MAINS CUT-OFF operating state, a connection of the furniture drive, i.e. the power supply, to a mains connection is interrupted by means of a mains disconnection device. When the mains disconnection device is switched on, the mains disconnection device recognizes the MAINS CUT-OFF operating state when it is switched off, i.e. a connection to the mains is required to operate the furniture drive. The mains disconnection device also detects when the MAINS CUT-OFF operating state can be resumed.

A received acoustic signal is converted into an electrical signal and fed to a local voice analysis device for evaluation. If a keyword from a set of keywords is recognized during the evaluation, an operating state of the furniture drive is controlled, wherein this operating state is switched on or off depending on one or more keywords.

Thus, in the method step controlling an EMERGENCY STOP operating state of the furniture drive, a stopping of a movement of the at least one adjustment drive is carried out. The locally evaluated voice input is thus used for emergency shutdown in case of danger. The calling out of certain keywords such as "stop", "halt", "help", "ouch" is a natural and very fast reaction in the event of danger, thus enabling a safe and reliable emergency shutdown. The local evaluation offers a high degree of reliability.

Alternatively and/or in addition, the locally evaluated voice input serves as a general shutdown. The shutdown can refer to individual or groups of adjustment drives, but it can also relate to all electrical consumers connected to the control device, such as motors, lights, massage devices or elements for heating and/or cooling.

In the method step in which the step of controlling a STAND-BY operating state of the furniture drive comprises switching on and/or off a STAND-BY operating state of a transmission unit and/or an interface device, the transmission unit and/or the interface device is switched to or "woken up" from a power saving mode.

The method step of controlling a MAINS CUT-OFF operating state of the furniture drive comprises activating and/or deactivating a mains cut-off. This is advantageous for disconnecting the mains from the furniture drive.

A received acoustic signal is converted into an electrical signal and fed to a local voice analysis device for evaluation. If a keyword from a set of keywords is detected during the evaluation, a movement of the at least one adjustment drive is stopped. The locally evaluated voice input thus serves as an emergency shutdown in case of danger. Calling out certain keywords such as "stop", "halt", "help", "ouch" is a natural and very fast reaction in the event of danger, thus enabling a safe and reliable emergency shutdown. The local evaluation offers a high degree of reliability.

In an advantageous embodiment of the method, the set of keywords is predefined. It preferably comprises less than 10 and especially less than 6 keywords. It has been shown that despite all the individuality of the users of the furniture or furniture drive, the expressions proclaimed in the event of danger can be reduced to the small number of keywords mentioned. This simplifies the local evaluation, which can be implemented accordingly with low hardware expenditure or low computing power.

In order to alleviate a possibly already occurred trapping situation, it is provided in another advantageous embodiment of the method to reverse a movement of the at least one adjustment drive at least for a short time after a stop.

For the "regular" control of the furniture drive, a further advantageous embodiment of the method provides for the control device to receive control commands for the at least one adjustment drive from a manual operating unit by wire or wireless means. A special hand control unit and/or a mobile device set up as such, such as a smartphone or tablet, can thus be used to set different positions of the furniture.

In addition or alternatively, the control device can have an interface device for at least one external voice analysis device, wherein the interface device digitizes the electrical signal and sends it in the form of data via a network for voice analysis to an external voice analysis device, which evaluates the data and sends it back as voice information (e.g. in text form), whereupon the voice information is evaluated in the control device and is converted into a control command for the at least one adjustment drive. In this way, already available voice analysis services are used to implement a convenient voice control with low internal hardware and/or software expenditure. This can be implemented without risk, as the local voice analysis device with the emergency shutdown function it provides in a secure manner provides the necessary operational safety independently of the external voice analysis. For this purpose, the local voice analysis device acts on the at least one adjustment drive with a priority that is higher than that of the manual control and/or the external voice analysis device.

It should also be mentioned that it is quite practicable or even desired that the local and the external voice analysis device can trigger the same command for switch-off and transmit it to the control device and/or the furniture. This can take place with a time delay, which is of no importance to the user. There is no limitation of the operating comfort. Both systems, the external and the local voice analysis device, are in principle arranged parallel to each other in terms of signal technology, operate autonomously from each other and thus generate a switch-off of at least one motor independently of each other. In this sense the two systems complement each other. Since the local voice analysis device according to the invention is designed to be reactive to shorter and scarcer keywords, and the signal paths are also shorter, it will more quickly issue the command to switch off the at least one motor. On the other hand, the external voice analysis device may have a larger vocabulary and an extended voice comprehension, which increases the operating comfort in regular operating situations (i.e. not emergency or dangerous situations).

In one variant, the local voice analysis device is only ever active when an adjustment drive is operated. Alternatively, the local voice analysis device is always active and always ready to record and receive a keyword, even if one of the electrical consumers of the piece of furniture, such as an adjustment drive, is switched off. Receiving a keyword unintentionally or by external supply, for example as a word fragment within a conversation between people or as a playback from a TV loudspeaker, can lead to unintentional switching off. If the respective adjustment drive is already switched off anyway, this circumstance is not noticeable to the user. This is because if at least one motor is not in operation, the system does not remain in the switch-off operating state and can be put back into operation at any time. Unlocking the system is not necessary in such situations, as the at least one adjustment drive is detected as already switched off.

The external voice analysis device is preferably run as a cloud service on a server within the network. The data can be exchanged with the external voice analysis device via an API interface.

A control device according to the invention for a furniture drive, to which at least one adjustment drive can be connected, comprises a local voice analysis device which is set up to perform such a method. The advantages mentioned in connection with the method result.

In a preferred embodiment, the local voice analysis device is implemented in the form of a structural unit, optionally consisting of only one component. The structural unit can be arranged on its own printed circuit board or alternatively fill a partial area of a circuit board of the engine control unit. The structural unit can be composed of several electronic components. Preferably, however, the structural unit is available as a single-chip solution, as it can also be understood as a System On Chip (SOC). The structural unit has input connections, output connections and power supply connections. At least one input connection is electrically connected to the receiver, for example in the form of a microphone, to receive the acoustic signal. At least one output connection is operatively connected to a control switch such as a relay or semiconductor switch for direct or indirect control of the at least one electric motor. The at least one output connection can, for example, have two different logic states, which are either in the closed or open switching state or, in further configuration, in the live or de-energized state. The latter state can also be understood as a high or low state. The signal at the output connection sets the respective operating state for the furniture drive.

In a particularly compact design, the structural unit has a power supply and only the aforementioned (single- or double-pole) microphone input and the control output. Optionally, a control input can be provided for the unit, for example to set it to a teach-in state in which keywords can be taught. The structural unit is thus both compact and small, as well as not very demanding in terms of the required electrical connections, so that it can be easily integrated into existing circuit architectures.

In an advantageous design, the control unit has an interface for an external voice analysis device. Thus, a comfortable and yet secure voice input for the furniture drive can be implemented in a straightforward manner.

Preferably, the control device itself has a microphone for converting the acoustic signals into electrical signals or provides a connection for a microphone, wherein electrical signals from the microphone are fed to the local voice analysis device and/or the external voice analysis device, in particular, a microphone used jointly by the local and the external voice analysis device reduces the component expenditure for the control device.

It is provided in a further design that the control device has at least one microphone which is integrated into a voice control subunit together with a voice analysis device and forms a complete unit therewith. It is thus advantageously possible, in particular for the control of the EMERGENCY STOP operating state, to use a voice control subunit in a simple and compact configuration with a significantly small space requirement cost-effectively on its own or also as a redundancy with a particularly fast reaction. This voice control subunit can also be used for other purposes, e.g. power saving mode, stand-by operation, control of a mains cut-off.

BRIEF DESCRIPTION OF THE DRAWING

The invention is explained in more detail below by means of embodiment examples, wherein.

DETAILED DESCRIPTION OF PREFERRED EMBODIMENTS

Figure 1:
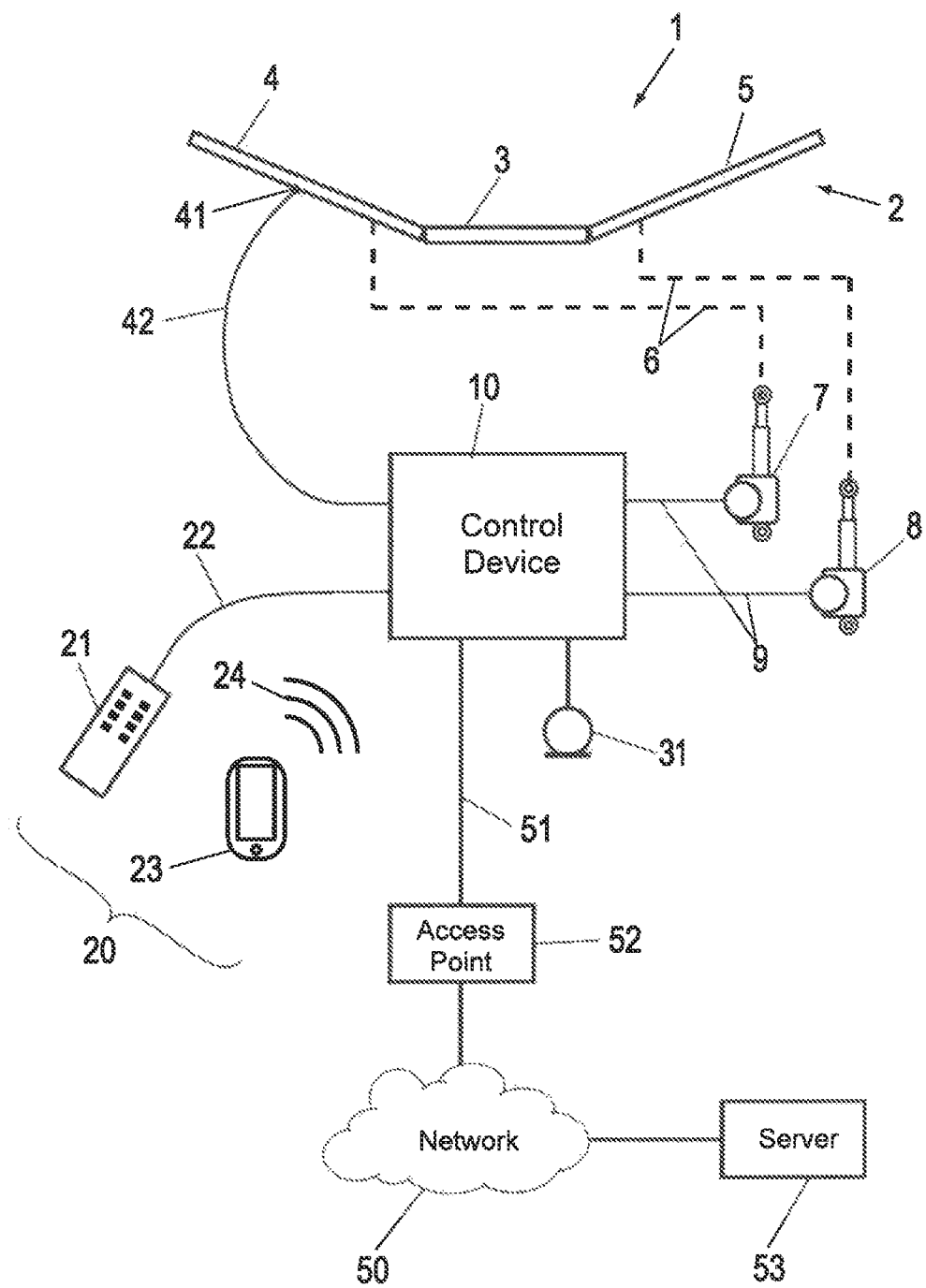
FIG. 1 shows a schematic representation of a bed with a furniture drive and a first embodiment example of a voice-controlled control unit.

FIG. 1 shows a bed 1 as an example of a piece of furniture with an electromotive furniture drive and a first embodiment example of a voice-controlled control device 10 in a schematic view. The method according to the invention can also be implemented in connection with furniture other than a bed, for example an armchair and/or a (lifting) table.

Bed 1 has at least one support element 2 for receiving a mattress not shown here. Bed 1 can be designed as a single bed for one person or as a double bed for several persons. The support element 2 is made of several plate-shaped parts or of a slatted frame and is placed or mounted on a base element not shown here, e.g. a frame with feet.

In the example shown, the support element 2 has a back part 4 and a leg part 5, which are arranged in a movable manner relative to a fixed middle part 3 or relative to the base element. This movable arrangement is realized, for example, by means of a so-called movement fitting not shown here. The movement is designed to be displaceable and/or pivotable.

The bed 1 shown in this example is equipped with an electromotive furniture drive. The movably mounted back part 4 and the leg part 5 are each coupled to an electromotive adjustment drive 7, 8 via a mechanical connection 6 shown only schematically. Thus, the back part 4 is coupled to the electromotive adjustment drive 7. The electromotive adjustment drive 8 is provided for moving or adjusting the leg part 5.

The electromotive adjustment drives 7, 8 are designed as linear drives. The linear drives have one or a number of electric motors, wherein each motor is usually followed by a speed reduction gear with at least one gear stage. A further gear, for example in the form of a threaded spindle gear, can be connected downstream of the speed reduction gear, which generates a linear movement of an output element from the rotational movement of the motor. The last gear element or a further element connected to it forms the output element. The output element of the respective electromotive adjustment drive is connected to the respective furniture component (back part 4, leg part 5) or alternatively to a component connected to the base element, so that when the electric motor of the respective adjustment drive 7, 8 is operated, the movable furniture components 4, 5 are adjusted relative to one another or relative to the base element.

The electromotive adjustment drives 7, 8 are electrically connected to a control device 10 for their control. This connection can, for example, be designed as a pluggable cable connection 9. The control device 10 has an power supply unit 100 (see FIG. 6) which provides the electric power, e.g. from a power supply network, for the electromotive adjustment drives 7, 8. For this purpose, the control device 10 can be connected to a mains supply via a mains cable 101 with a mains plug 102 (see FIG. 3). Via the mains cable 101 the mains plug 102 conducts the mains voltage on the input side to the power supply unit 100 of the control device 10 which on the secondary side delivers a low voltage in form of a direct voltage.

Alternatively, an external mains-dependent power supply unit 100 with mains input/mains plug 102 and with an extra-low voltage output on the secondary side is connected upstream of the control device 10, which supplies the extra-low voltage in the form of a direct voltage via the line.

In an alternative design, the control device 10 is not or not completely arranged in a separate housing, but is completely or partially integrated in one of the adjustment drives 7, 8. This adjustment drive then represents a main drive to which further adjustment drives can be connected if necessary.

The electromotive furniture drive can have different operating states. The following operating states are possible, among others: OFF operating state, ON operating state, STAND-BY operating state, EMERGENCY STOP operating state, MAINS CUT-OFF operating state.

In the OFF operating state, one or more motors of the furniture drive is/are switched off, but can be switched to the ON operating state by an actuator. A power supply for control device 10 is available.

In the ON operating state, one or more motors of the furniture drive is/are switched on, e.g. by means of manual operation. The power supply of control device 10 is available.

In STAND-BY operating mode, the power supply of the control device 10 and any other transmission units, such as radio gateway and the like, is reduced to a minimum. If the STAND-BY operating mode is switched on, it must be switched off to enable the furniture drive to be operated. Switching off the STAND-BY operating mode is also known as "waking up".

It is not possible to switch on the furniture drive motor(s) in the EMERGENCY STOP operating state. If the EMERGENCY STOP operating state is switched on during the ON operating state, any motor(s) that are switched on will be switched off immediately. The power supply of control device 10 is available. The EMERGENCY STOP operating state is terminated by suitable measures not described in more detail here once the cause of the EMERGENCY STOP has been eliminated.

In the MAINS CUT-OFF operating state, a connection of the furniture drive, i.e. the power supply, to a mains connection is interrupted by means of a mains disconnection device. In the activated MAINS CUT-OFF operating state, the mains disconnection device recognizes when it is switched off, i.e. a connection to the mains is required to operate the furniture drive. The mains disconnection device also detects when the MAINS CUT-OFF operating state can be resumed.

FIG. 1 shows two alternative possibilities of a manual control 20 for the furniture drive. In one design, a cable-connected manual operating unit 21 may be provided which has operating elements, e.g. in the form of buttons. In an alternative design, the manual operating unit 21 can also be wirelessly connected, in which case it has a transmission device for wireless transmission of signals to control device 10. An actuation of the operating elements is transmitted via the illustrated connecting cable 22 to the control device 10, which controls the adjustment drives 7, 8 according to the operated elements. This control may be subject to certain restrictions, e.g., certain adjustment drives 7, 8 or certain adjustment ranges may be excluded from an adjustment or may only be accessible after release, e.g., by means of a key-operated control device or a similar higher-level element. In addition, one or more limit switches can be arranged in each of the adjustment drives 7, 8 to prevent movement over one or two defined end points.

The manual operating unit 21 can be connected to the control device 10 via the connecting cable 22 as shown in FIG. 1. Alternatively, the manual operating unit 21 can be provided with a transmission device for a wireless transmission of signals to the control device 10. The wireless transmission can be realized by a radio transmission path, an optical transmission path (e.g. for infrared light) and/or an ultrasonic transmission path, wherein the control device 10 is equipped with a respective corresponding receiving unit.

Also as an alternative or in addition to the manual operating unit 21, the manual control 20 can be carried out by a mobile device 23. In particular, the mobile device 23 can be a commercially available mobile telephone ("smartphone") or a tablet computer. Preferably, a software ("app") for the function as a hand control unit is installed on mobile device 23. Control commands to the adjustment drives 7, 8 can thus be sent to the control device 10 via a wireless transmission link 24 from the mobile device 23 used as a handheld control. The wireless transmission link 24 can be based on a WLAN (Wireless Local Area Network) or Bluetooth transmission path, for example. The wireless transmission from manual operating unit 21 via wireless link 24 can be sent directly to control device 10. In alternative designs, transmission is also possible via an access point 52 of a network 50 to which the control device 10 is connected. Details on the network access of control device 10 are explained below.

In addition to the manual control 20, a voice control is implemented in the embodiment example of FIG. 1, which in the first embodiment example shown comprises a microphone 31 connected to the control device 10. Electrical signals from microphone 31, which reproduce the acoustic signals received by microphone 31, can also be used to control the adjustment drives 7, 8 and, optionally, other components of the furniture drive connected to control device 10 and controlled by control device 10.

As will be explained in more detail in connection with FIG. 2, the electrical signals from microphone 31 are partly evaluated in the control device 10 itself and, optionally, in an external voice analysis device.

In order to be able to use an external voice analysis device, the control device 10 is connected to the network 50 via a network connection 51 with the already mentioned access point 52, for example a so-called router. The network connection 51 can be wired, e.g. via an Ethernet cable, or wireless.

At least one server 53, which includes the external voice analysis device, is connected in the network 50 or via this network 50. A single such server 53 is shown as an example. It is understood that within the network 50 a plurality of such servers can be arranged within the framework of a cloud, wherein an allocation of requests to this server 53 within the network 50 is preferably automatic and transparent for the control device 10.

In the furniture drive of FIG. 1, the control device 10 is additionally connected to a sensor 41 via a sensor cable 42. Such a sensor 41 is attached to the back part 4 of bed 1 as an example and serves to detect oscillations (vibrations) in a frequency range that can extend from the sub-Hertz (Hz) range to the range of acoustic frequencies, i.e. a few 100 to 1000 Hz. Such a sensor 41 can, for example, be a piezo-electric or electromechanical vibration transducer. It can be attached to a frame component of bed 1, as shown, but can also be integrated into a mattress or upholstery of the bed not shown in FIG. 1. Such a sensor 41 can be used to monitor the sleep quality of a person using bed 1 by recording vibrations characteristic of the sleep quality. These oscillations can be caused by breathing and/or body movements during sleep.

In the example shown, the signals recorded by sensor 41 are evaluated, for example, directly in control device 10. In this way, an infrastructure connection of control device 10, for example, via the network 50 connection, can also be used advantageously for evaluation in connection with signals from sensor 41. If, for example, a critical sleep situation, such as respiratory arrest, is detected by control device 10, a warning signal can be output via control device 10 and network 50.

Figure 2:
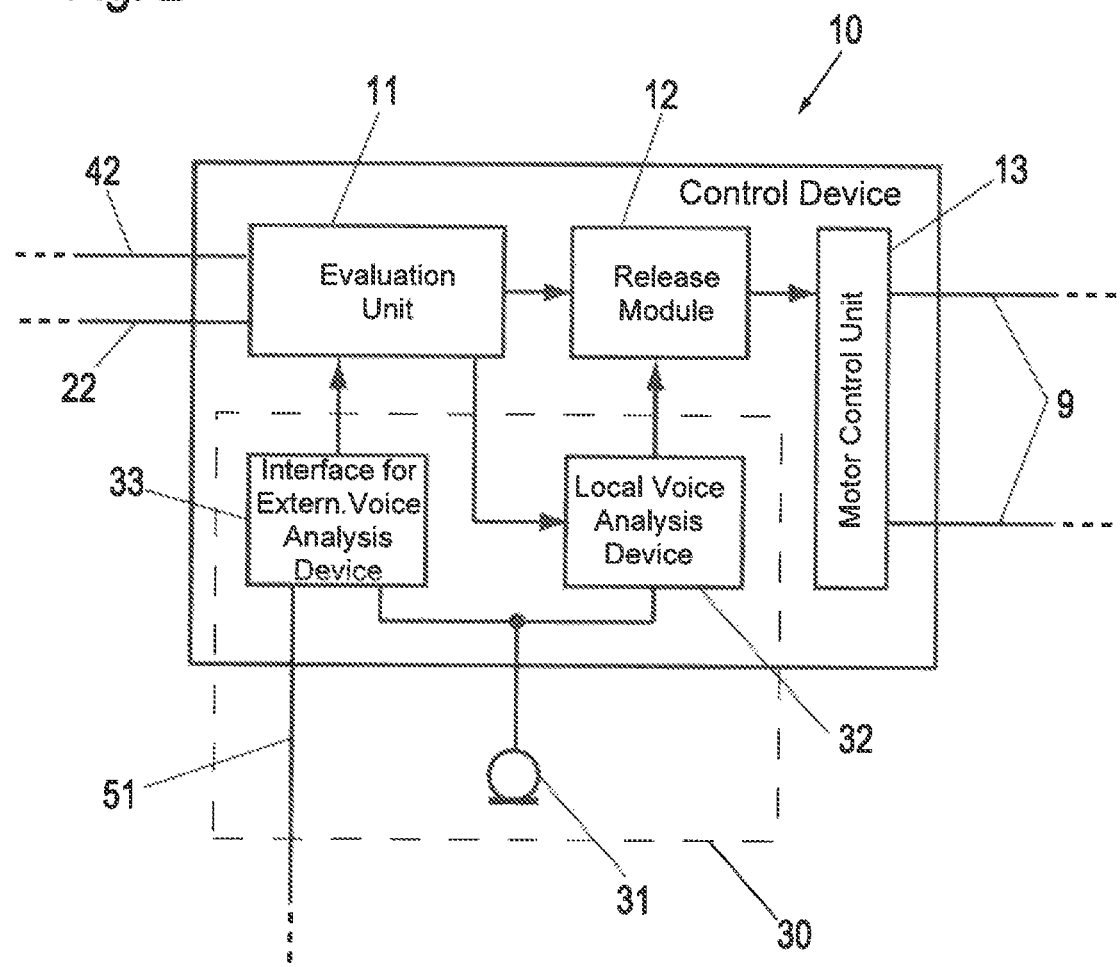
FIG. 2 shows a block diagram of the voice-controlled control device for the furniture drive according to FIG. 1.
Figure 6:
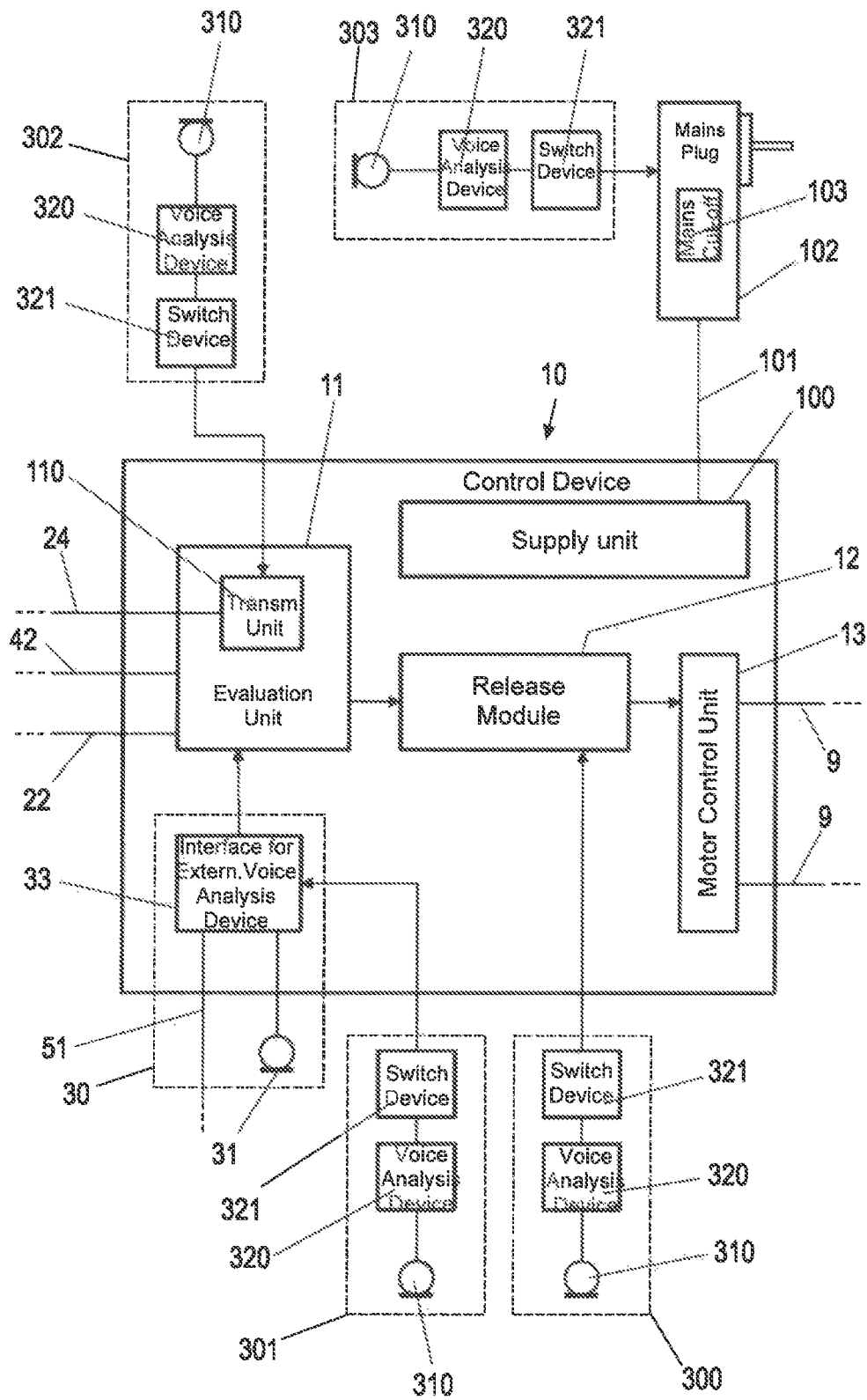
FIG. 6 shows a block diagram of a second variant of the second embodiment example of the voice-controlled control device for the furniture drive according to FIG. 3.

In FIG. 2, the control device 10 of the first embodiment example according to FIG. 1 is shown in more detail in the form of a block diagram. Not shown in this block diagram is a power supply for the control device 10 and/or the adjustment drives 7, 8. This is either integrated in the control device 10 in the form of a power supply unit, which thus also has a mains connection in addition to the connections shown. A supply unit 100 in connection with FIG. 6 is given below as an example. Alternatively, an external power supply unit can be provided which supplies the control device 10 with low voltage.

The control device 10 comprises an evaluation unit 11 which, in the example shown, evaluates signals from the manual operating unit 21 which are supplied via cable 22. Furthermore, the evaluation unit 11 is set up for the evaluation of supplied control commands of the mobile device 23 via the transmission path 24 with a transmission unit 110. If the control device 10 allows this control option, a receiver for signals of the transmission path 24, for example a Bluetooth receiver, can be arranged in the evaluation unit 11 or connected to the evaluation unit 11. A transmission unit 110 is shown schematically in FIG. 6 as an example of such a receiver. Alternatively, information from mobile device 23 for controlling the adjustment drives 7, 8 can also be transmitted to the evaluation unit 11 via network 50 and network connection 51 and analyzed there.

As a rule, the evaluation unit 11 has a microcontroller which evaluates the received control commands for the adjustment drives 7, 8. This microcontroller can also be used for other tasks, e.g. for evaluation of sensor 41. If necessary, an amplifier and/or a filter for signals of sensor 41 is included in the evaluation unit 11.

In the example shown, the evaluation unit 11 is connected to a motor control unit 13 via a release module 12. The motor control unit 13 receives instructions concerning the adjustment of the adjustment drives 7, 8 and converts them into corresponding motor currents for operating the adjustment drives 7, 8. In this sense, the motor control unit 13 can be regarded as the power output stage of the control device 10.

It should be noted that in alternative designs, adjustment drives which contain the motor control unit itself integrated may also be used. In this case, a corresponding motor control unit 13 in the control device 10 is omitted. The function of the release module 12 is explained below.

The microphone 31 already shown in connection with FIG. 1 is part of a voice control 30 of the control device 10 which is divided into two branches, one of which comprises a local voice analysis device 32 which is connected to the release module 12. Another branch comprises an interface device 33 for an external voice analysis device. The interface device 33 is connected to the network 50 via the said network connection 51 and access point 52 and thereby has access to the server 53 with the external voice analysis device. One output of the interface device 33 is coupled to the evaluation unit 11.

During operation of the control device 10, electrical signals from microphone 31 are digitized and sent from interface device 33 via network 50 to the external voice analysis device of server 53. The external voice analysis device analyzes the data and extracts a voice content. A recognized voice content is also transmitted back digitally, e.g. in the form of text. The text is evaluated by interface device 33 by checking for the presence of instructions for one of the adjustment drives 7, 8. Any instructions found are transmitted to the evaluation unit 11. Alternatively, the text can also be evaluated in this evaluation unit. The powerful external voice analysis provides a convenient way to control the adjustment drives 7, 8 and, if necessary, components connected to the control device 10.

Comfortable voice control means that the voice control 30 reacts flexibly to spoken words and can be trained and/or extended with regard to the usable vocabulary. This task requires high computing power and a complex voice analysis system. For this purpose, the control device 10 makes advantageous use of existing external voice analysis devices which can be contacted via the network 50 in server 53. Such services are provided by various Internet providers as so-called cloud services. As a rule, a standardized network interface technology in the form of an API (Application Programming Interface) or a standardized network request, e.g. via the REST protocol, can be used.

Typical spoken commands can take the form of "raise backrest" or "lower leg support" or "assume reading position" or similar. Commands of the form "save this position under the name . . . " are also conceivable when using powerful voice analysis. In addition, factory pre-set commands such as "move to TV position" or "move to zero gravity" or "move to lying position" can also be provided, which are linked to fixed pre-set adjustment positions for the head and/or foot section. The above-mentioned commands are purely exemplary and can be adapted as required to the functional possibilities of bed 1 or the furniture with the furniture drive. It is optionally provided to prefix a keyword first, which activates a transfer of the recorded voice to the server 53, so that recorded signals are only sent to the server 53 if they also affect the furniture drive.

As already mentioned, voice inputs sent to the server 53 by the interface device 33 and analyzed there are transmitted to the evaluation unit 11 in the form of control commands comparable to the control commands of the manual control 20 and from there are converted into a movement of the adjustment drives 7, 8 in the described ways.

Signals from the microphone are also made available in parallel to the local voice analysis unit 32. This is primarily used to record safety-relevant voice information which is evaluated locally and thus independently of the availability of network 50.

For example, it is provided that the local voice analysis device 32 immediately recognizes instructions such as "stop" or "halt" or passes on an emergency stop signal to release module 12. This then blocks any signal optionally received from the evaluation unit 11 for operating one of the adjustment drives 7, 8 and thus blocks further movement of the adjustment drives 7, 8. The blocking function of the local voice analysis device can of course also act on the evaluation unit 11 and be taken into account there or act directly on the motor control unit 13 and result in blocking of the adjustment drives 7, 8. In this way, the emergency stop operating state of the furniture drive is controlled.

The voice control 30 is convenient due to the external voice analysis, but it is still safe because the commands based on the external analysis can be overwritten at any time by the emergency shutdown by the local voice analysis device 32.

In alternative designs, it is conceivable that the adjustment drives 7, 8 will not only stop when a corresponding emergency stop command is issued by the local voice analysis device 32, but will stop and move at least a little in the opposite direction. In this way, a person in bed 1 who is impaired by the adjustment process can be brought back into a comfortable position or a slight jamming that has already occurred can be reversed.

The local voice analysis device 32 can make use of an additional microcontroller, a DSP (Digital Signal Processor) and/or an FPGA (Field Programmable Gate Array), wherein the aforementioned components are integrated in the form of an SOC (System On Chip) if necessary. With relatively low hardware effort, this way at least an analysis of voice inputs limited to a few keywords can be performed. The mentioned keyword "stop" for example can be easily and reliably identified by means of the characteristic phonetics. In addition to explicit words, sounds used in connection with dangerous or painful situations, such as "Ouch" or "Aah", can also be recognized and interpreted as signs to stop or reverse the adjustment drives 7, 8. In this way a further increased safety level is achieved.

If the control device 10 is connected to a vibration-sensitive sensor 41 as in the example shown, an amplified and/or filtered signal from the sensor 41 can also be fed to the local voice analysis device 32 and evaluated by it. In particular since an evaluation in the local voice analysis device 32 is limited to a few characteristic keywords, even a non-optimal signal quality or voice recording by the sensor 41 which is not optimally transmitted by the frequency transmission behavior is sufficient to detect keywords in the emergency situation and to stop the adjustment drives 7, 8.

It is noted that the shown voice-based emergency shutdown for the adjustment drives 7, 8, which is based on a local voice analysis device 32, can be combined with further safety measures to ensure comprehensive protection against trapping. In this sense, pressure or pushbutton sensors which are arranged on the moving bed elements or on a frame of bed 1 can also be evaluated and act on the release module 12 and thus on the motor control unit 13.

If the control device 10 has been deactivated by means of the emergency stop, the furniture drive is in the EMERGENCY STOP operating state.

Figure 3:
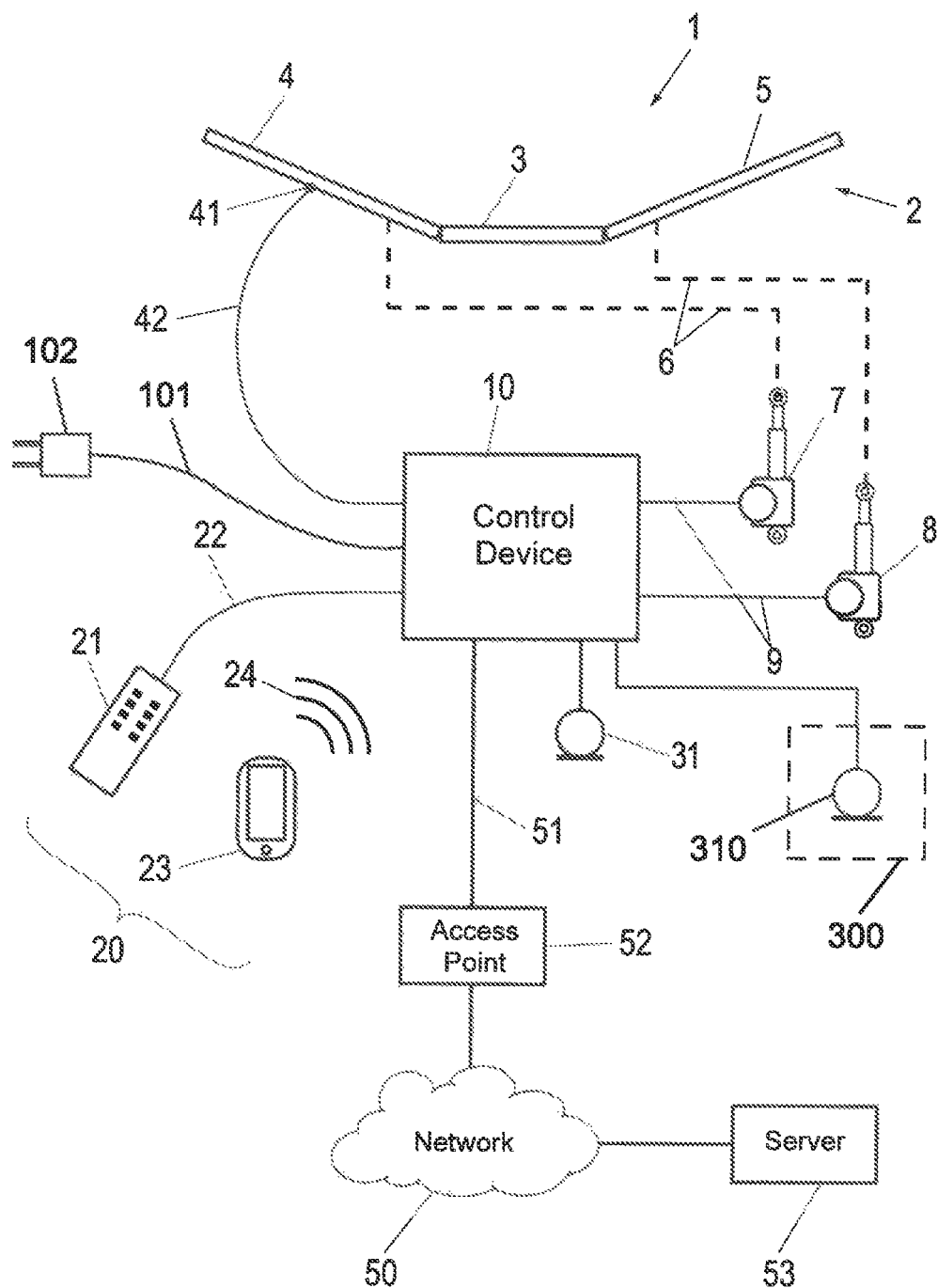
FIG. 3 shows a schematic representation of a bed with a furniture drive according to FIG. 1 and a second embodiment example of a voice-controlled control device.
Figure 4:
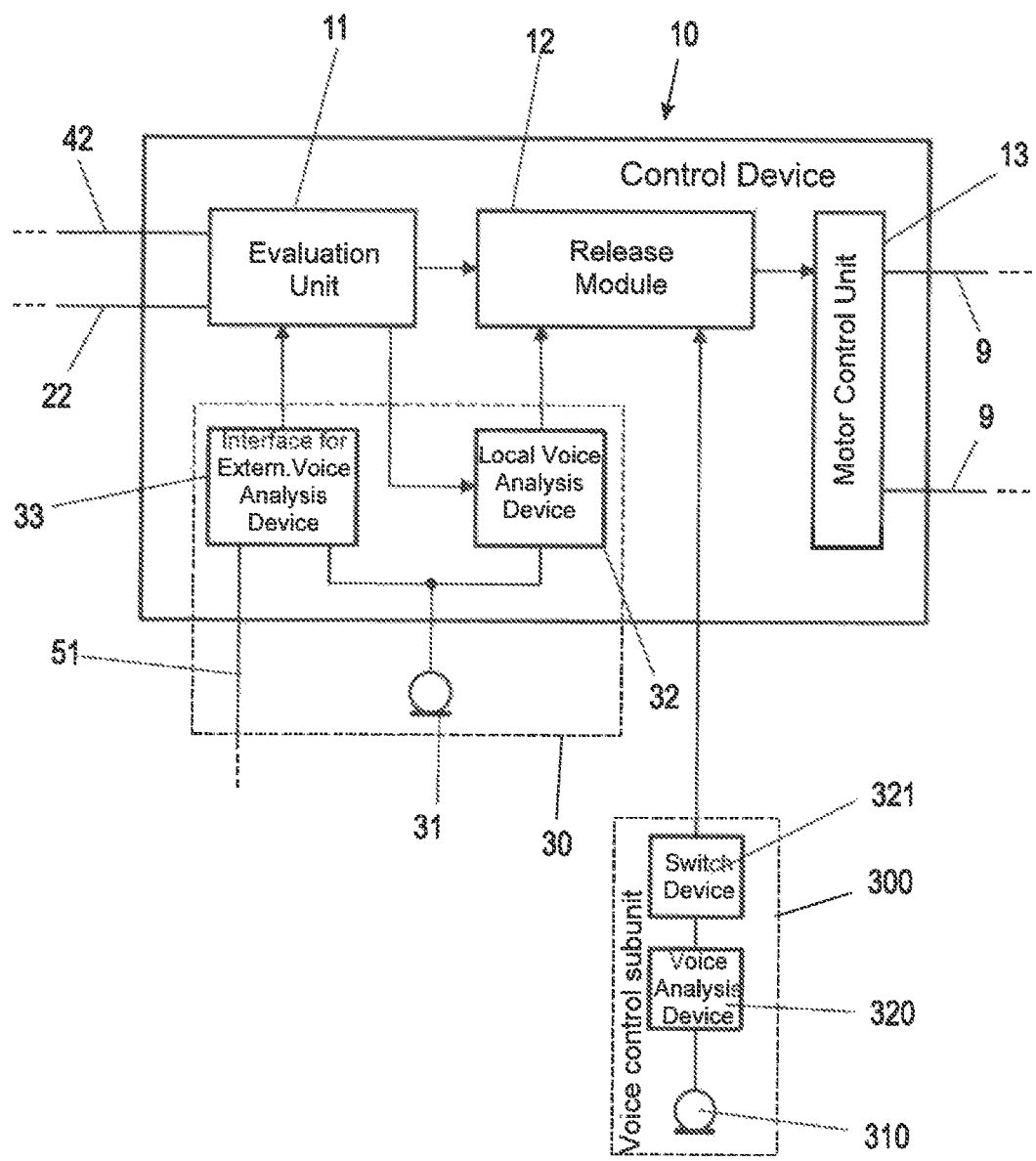
FIG. 4 shows a block diagram of the second embodiment example of the voice-controlled control device for the furniture drive according to FIG. 3.

FIG. 3 shows a schematic representation of bed 1 with the furniture drive according to FIG. 1 and a second embodiment example of a voice-controlled control device 10. FIG. 4 shows a block diagram of the second embodiment example of the voice-controlled control device 10 for the furniture drive according to FIG. 3.

In contrast to the first embodiment example according to FIGS. 1 and 2, a further microphone 310 of a voice control subunit 300 is provided here. This voice control subunit 300 comprises the further microphone 310, a voice analysis device 320 and a switching device 321.

The voice control subunit 300 is a very small, fully integrated component. With its voice recognition, which takes place by means of the voice analysis device 320 of the words recorded by microphone 301, the voice control unit 300 is able to recognize individual words or phrases. The voice control subunit 300 can, for example, be designed only for special words and can therefore be particularly fast.

Depending on the words or phrases recognized (as already described above), an electrical signal can be output to the control system by means of the switching device 321. This switching device 321 can be integrated into the voice control unit 300 (as shown) or can be arranged externally. For example, it is designed as a semiconductor switch and/or electromechanical contact (relay).

In FIG. 4 it is shown that the voice control subunit 300 is arranged parallel to the one branch comprising the local voice analysis device 32 connected to the release module 12 and is also connected to the release module 12, wherein here the switching device 321 of the voice control subunit 300 is connected to the release module 12.

In this way, a redundancy of the branch of the local voice analysis device 32 connected to the release module 12 is formed by the voice control subunit 300. This results in increased safety for controlling the EMERGENCY STOP operating state of the furniture drive. In other words, stopping a movement of the at least one adjustment drive 7, 8 at a corresponding keyword is triggered not only via microphone 31 and the local voice analysis device 32, but also simultaneously via the additional microphone 310 of the voice control subunit 300.

Like the local voice analysis device 32, the voice control subunit 300 immediately recognizes instructions such as "stop" or "halt" and transmits an emergency stop signal to the release module 12.

It is conceivable that the release module 12 may also be provided twice, wherein the first release module is connected to the local voice analysis device 32 and the second release module is connected to the voice control subunit 300.

However, the voice control subunit 300 may also be connected at another location. For example, the voice control subunit 300 may be designed alone or additionally as an external component for a bus arrangement (MFP/Furnibus). It is also possible that the voice control subunit 300 alone or in addition is installed in a WiFi radio gateway or looped into the supply line to the motors.

Figure 5:
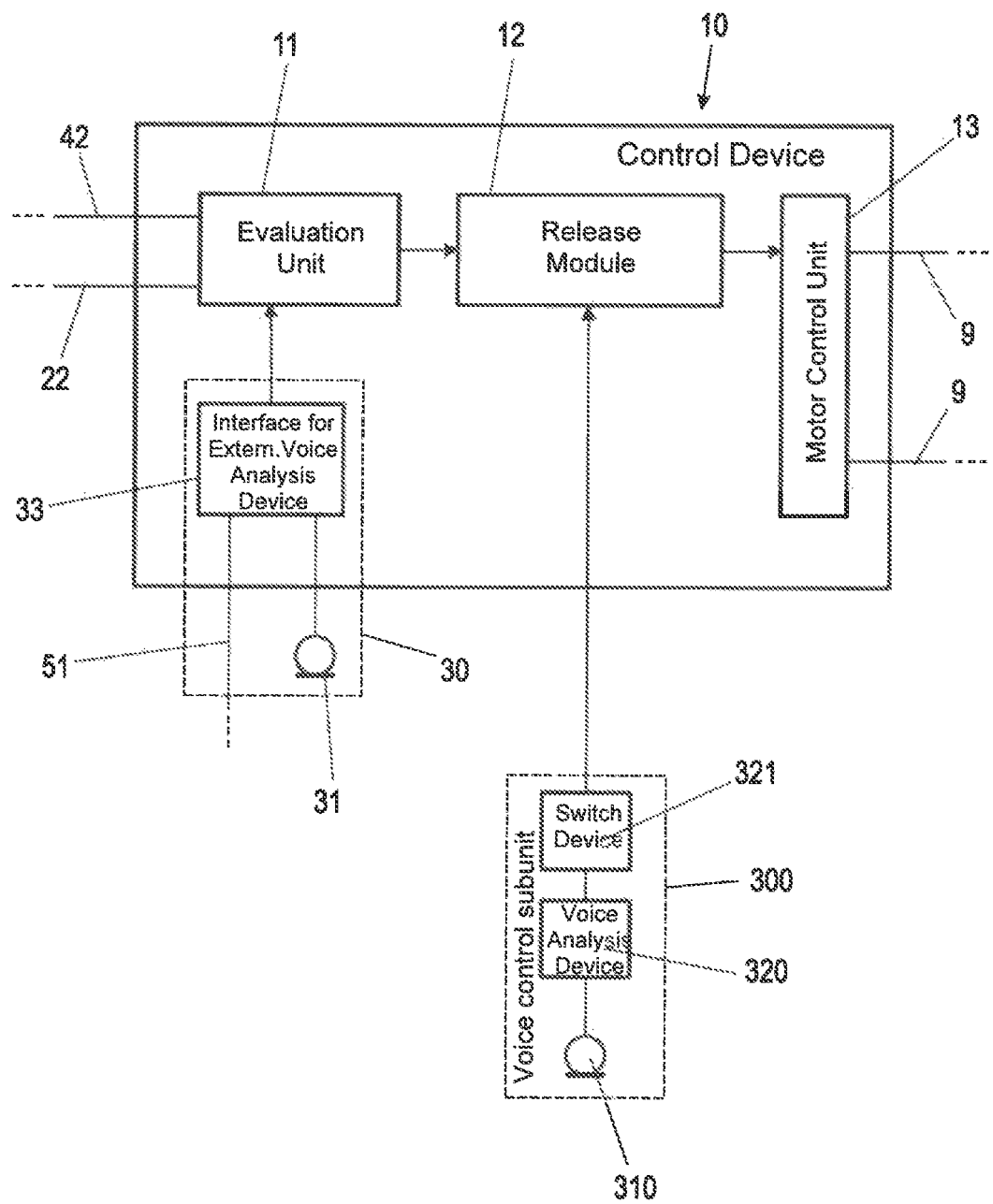
FIG. 5 shows a block circuit diagram of a first variant of the second embodiment example of the voice-controlled control device for the furniture drive according to FIG. 3.

FIG. 5 shows a block diagram of a first variant of the second embodiment example of the voice-controlled control device 10 for furniture drive according to FIG. 3.

In this variant, the branch of the local voice analysis device 32 of the voice control 30 connected to the release module 12 is not present. Instead, the voice control subunit 300 is provided. Of course, further voice control subunits 300 can also be installed as redundant voice control subunits 300 parallel to this or/and at the points already mentioned above.

FIG. 6 shows a block diagram of a second variant of the second embodiment example of the voice-controlled control device 10 for the furniture drive as shown in FIG. 3.

An exemplary use of four voice control subunits 300 in addition to the voice control 30 with the microphone 31 is shown.

The first voice control subunit 300 is connected here, as in the first variant, to the release module 12 and, like the local voice control device 32, immediately recognizes instructions such as "stop" or "halt" and passes an emergency stop signal to the release module 12.

The second voice control subunit 301 is here connected to the interface device 33 of the voice control 30 and recognizes instructions such as "stand-by ON/OFF", "power saving ON/OFF", etc. Thus, the second voice control unit 301 controls the STAND-BY operating mode by switching the interface device 33 to a power saving mode when a keyword such as "stand-By ON" or similar is detected. The power saving mode is switched off again when the second voice control unit 301 recognizes a keyword such as "stand-By OFF" or any other keyword for "wake-up".

In this second variant, a transmission unit 110 is also specified in the evaluation unit 11. The transmission unit 110 is connected to the transmission link 24 and can, for example, be a receiver/transmitter for a wireless transmission link 24, e.g. infrared, ultrasonic, radio. Transmission unit 110 is also connected to a third voice control subunit 302.

The third voice control subunit 302 also detects instructions such as "stand-by ON/OFF", "power saving ON/OFF", etc., and controls the STAND-BY mode by switching the transmission unit 110 to a power saving mode or "waking" it from its power saving mode when it detects a corresponding keyword and switching it back.

In FIG. 6, the supply unit 100 is also shown inside the control device 10 and is connected via the mains cable 101 to the mains plug 102 for connection to a mains supply. In addition, the mains plug 102 is arranged here together with a mains cut-off 103 in a housing as a plug-in power supply unit. In this variant, the mains cut-off 103 is connected to a fourth voice control subunit 303.

With the mains cut-off 103, the furniture drive can be completely or only partially disconnected from an electrical power supply or from a battery/rechargeable battery supply. The mains cut-off 103 uses various devices not described here to detect when the MAINS CUT-OFF operating state is to be changed, i.e. switched on or off. In the variant shown here, this is detected by the fourth voice control subunit 303 by means of a keyword such as "enable ON", "mains OFF" and/or "enable OFF", "mains ON" and the like. Depending on the recognized keyword, the fourth voice control subunit 303 then controls the MAINS CUT-OFF operating state via the mains cut-off 103.

It is also conceivable that external complex voice recognition modules can be equipped with an additional voice control subunit 300.

In most cases, the control device 10 of the furniture drive is located under the bed together with the furniture drive. It is therefore necessary that the microphone(s) 31/310 of the voice control 30/voice control subunits 300, 301, 302, 303 are placed in a position where they are not soundproofed by the bed, parts of the bed or other objects. For this reason the microphones 31/310 or the voice control subunits 300, 301, 302, 303 can be placed outside the bed, e.g. on a bedside table or in a non-soundproof place, and can be connected to the control device 10 via a cable connection or wirelessly.

The microphones 31/310 or the voice control subunits 300, 301,302, 303 can be powered by batteries, rechargeable batteries or small power supply units. Power supply units in which the microphones 31/310 or the voice control subunits 300, 301, 302, 303 are integrated can also be used.

Furthermore, it is possible that a so-called dead man's circuit is provided together with the microphones 31/310 or voice control subunits 300, 301, 302, 303 placed in the manner described above. Here, very short data sets are exchanged between the microphones 31/310 or voice control subunits 300, 301, 302, 303 and the control device 10, in particular by means of bidirectional transmission. In this case the control device 10 is designed in such a way that it switches on the EMERGENCY STOP operating state if the microphone 31/310 or the or a specific one of the voice control subunits 300, 301, 302, 303 has lost contact with the control device 10 within a definable time interval, e.g. 1 to 2 s.

Deactivation or switching off of the EMERGENCY STOP operating state can be carried out e.g. by means of an app or in another suitable way.

The invention claimed is:

1. A method for controlling via voice input a furniture drive which comprises a control device connected to at least one adjustment drive, the method comprising:
converting acoustic signals into electrical signals;
sending the electrical signals as data to an external voice analysis device via a network for data evaluation and returning the evaluated data via the network to the control device as voice information;
evaluating the voice information at an evaluation unit of the control device and converting the voice information into control commands at the evaluation unit for controlling the at least one adjustment drive;
evaluating the electrical signals by at least one local voice analysis device, the at least one local voice analysis device operating autonomously from the external voice analysis device, and controlling an operating state of the furniture drive independently from the evaluation unit when a keyword from a set of keywords is recognized during evaluation of the electrical signals by the at least one local voice analysis device, wherein the at least one local voice analysis device operates on the at least one adjustment drive with a priority which is higher than a priority of the external voice analysis device.

2. The method of claim 1, wherein the operating state is an EMERGENCY STOP operating state of the furniture drive and controlling the operating state stops a movement of the at least one adjustment drive.

3. The method of claim 2, further comprising reversing the movement of the at least one adjustment drive at least briefly after the movement of the at least one adjustment drive has been stopped.

4. The method of claim 1, further comprising setting up the control device of the furniture drive in connection with the at least one adjustment drive for wired or wireless reception of control commands for the at least one adjustment drive from a manual control.

5. The method of claim 4, wherein the at least one local voice analysis device operates on the at least one adjustment drive with a priority that is higher than a priority of the manual control.

6. The method of claim 1, further comprising:
digitizing the electrical signals by an interface device of the control device which is connected to the extremal voice analysis device; and
transmitting the digitized electrical signal as the data to the extremal voice analysis device for voice analysis via the network.

7. The method of claim 6, further comprising embodying the extremal voice analysis device as a cloud service on a server.

8. The method of claim 6, further comprising exchanging the data with the extremal voice analysis device via an API (Application Programming Interface).

9. The method of claim 6, further comprising a release module of the control device connected to the at least one local voice analysis device.

10. The method of claim 1, wherein the operating state is a STAND-BY operating state of the furniture drive and controlling the operating state switches on or off a transmission unit and/or an interface device.

11. The method of claim 1, wherein the operating state is a MAINS CUTOFF operating state of the furniture drive and controlling the operating state activates or deactivates a mains cut-off.

12. The method of claim 1, wherein the set of keywords is predetermined.

13. The method of claim 1, wherein the set of keywords comprises less than 10 keywords.

14. The method of claim 1, wherein the set of keywords comprises less than 6 keywords.

15. A control device connected to at least one adjustment drive for a furniture drive, comprising:
at least one local voice analysis device configured to receive electrical signals converted from acoustic signals, to evaluate the received electrical signals, and to control an operating state of the furniture drive when a keyword from a set of keywords is recognized during evaluation of the received electrical signals; and
an interface device connected to an external voice analysis device, the external voice analysis device operating autonomously from the at least one local voice analysis device, the interface device configured to digitize the electrical signals for transmission as data to the external voice analysis device for voice analysis via a network, said external voice analysis device configured to evaluate the data and return the evaluated data via the network as voice information to an evaluation unit of the control device and for converting the voice information into control commands at the evaluation unit for controlling the at least one adjustment drive independently from the at least one local voice analysis device, wherein the at least one local voice analysis device operates on the at least one adjustment drive with a priority which is higher than a priority of the external voice analysis device.

16. The control device of claim 15, further comprising a microphone which converts the acoustic signals into the electrical signals.

17. The control device of claim 16, wherein the microphone together with the at least one local voice analysis device are integrated in a voice control subunit and form a complete unitary structure, with the voice control subunit being connected to the control device.

18. The control device of claim 15, wherein the operating state is an EMERGENCY STOP operating state of the furniture drive to stop a movement of the at least one adjustment drive.

19. The control device of claim 15 wherein the operating state is a STANDBY operating state of the furniture drive to switch on or off a transmission unit and/or an interface device.

20. The control device of claim 15, wherein the operating state is a MAINS CUTOFF operating state of the furniture drive to activate or deactivate a mains cut-off.

21. The control device of claim 15, wherein the set of keywords is predetermined.

22. The control device of claim 15, wherein the set of keywords comprises less than 10 keywords.

23. The control device of claim 15, wherein the set of keywords comprises less than 6 keywords.

24. The control device of claim 15, wherein the external voice analysis device is provided as a cloud service on a server connected to the network.

25. The control device of claim 15, wherein the data are exchanged with the external voice analysis device via an API (Application Programming Interface).

26. The control device of claim 15, wherein the at least one local voice analysis device operates on the at least one adjustment drive with a priority that is higher than a priority of a manual control.

27. The control device of claim 15, further comprising a release module of the control device connected to the at least one local voice analysis device.

* * * * *